Oct. 7, 1947.  V. E. PRATT ET AL  2,428,681
APPARATUS FOR AUTOMATICALLY PROCESSING FILM
Filed Oct. 28, 1943  6 Sheets-Sheet 1
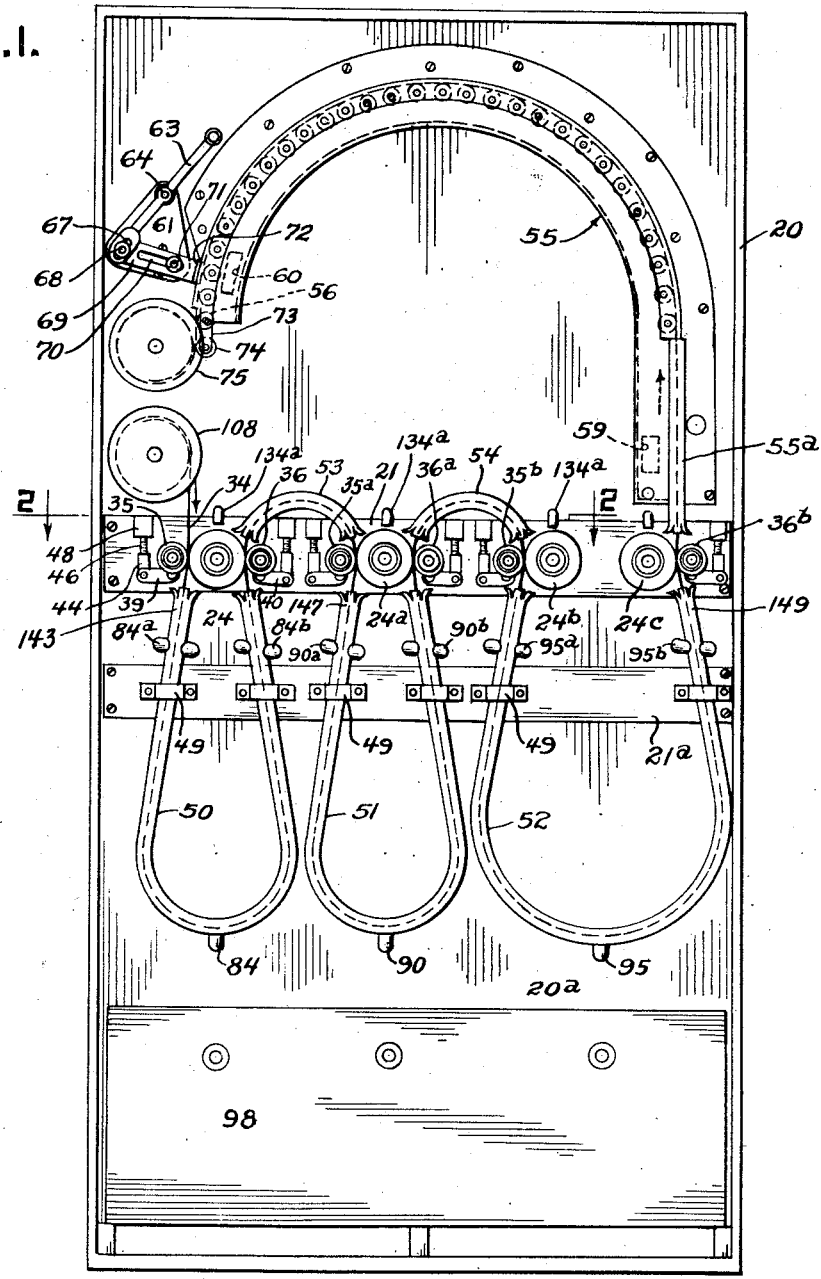
INVENTORS.
VERNEUR E. PRATT
GEORGE F. GRAY
DANIEL E. REED
BY
Van Deventer + Grier
ATTORNEYS.

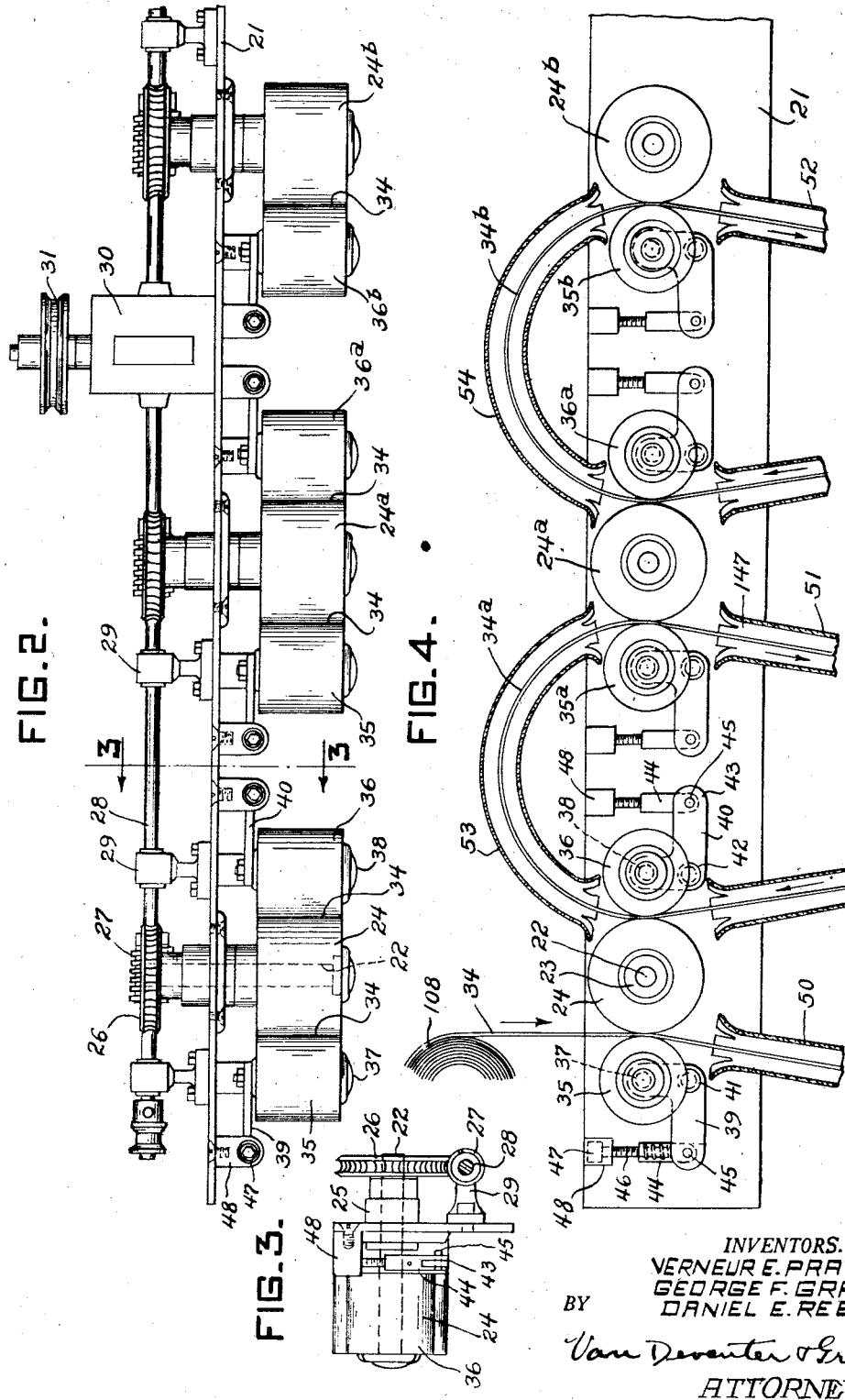

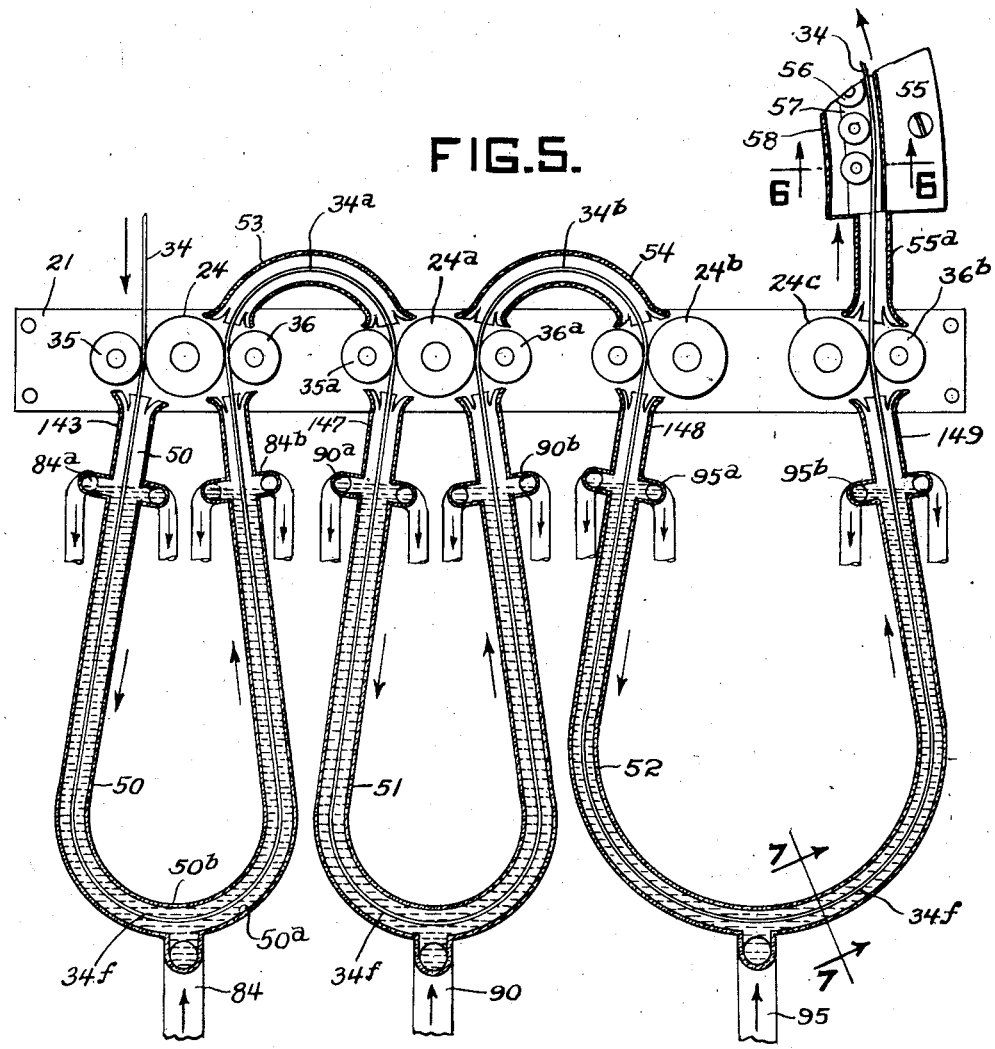

Oct. 7, 1947.  V. E. PRATT ET AL  2,428,681
APPARATUS FOR AUTOMATICALLY PROCESSING FILM
Filed Oct. 28, 1943  6 Sheets-Sheet 4
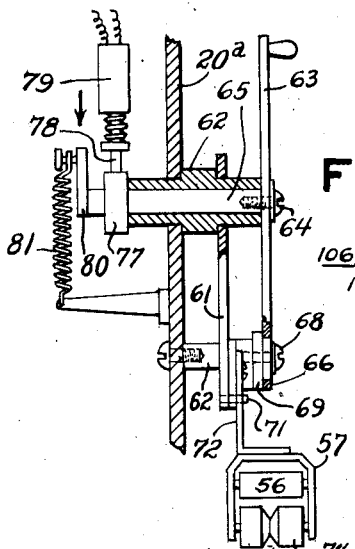
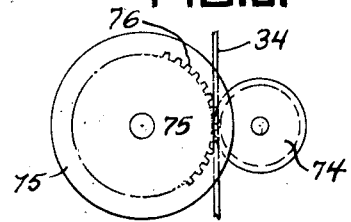
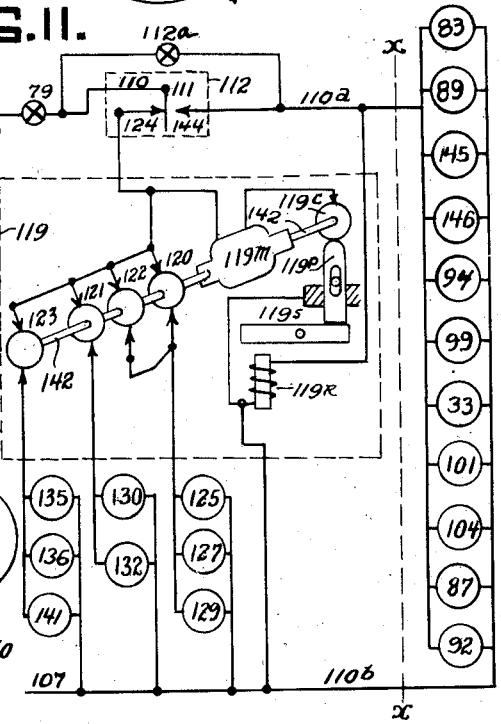
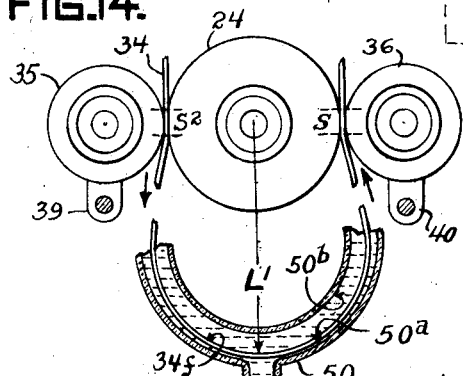
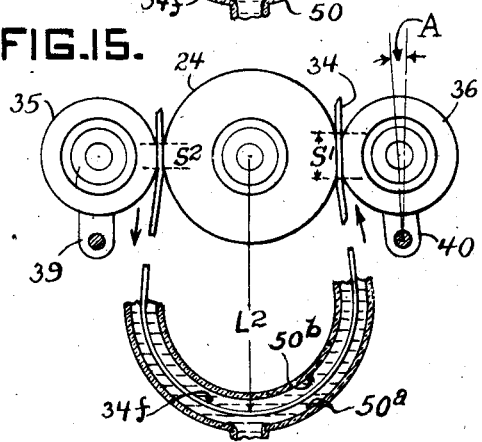
INVENTORS.
VERNEUR E. PRATT
GEORGE F. GRAY
DANIEL E. REED
BY
Van Deventer & Grier
ATTORNEYS.

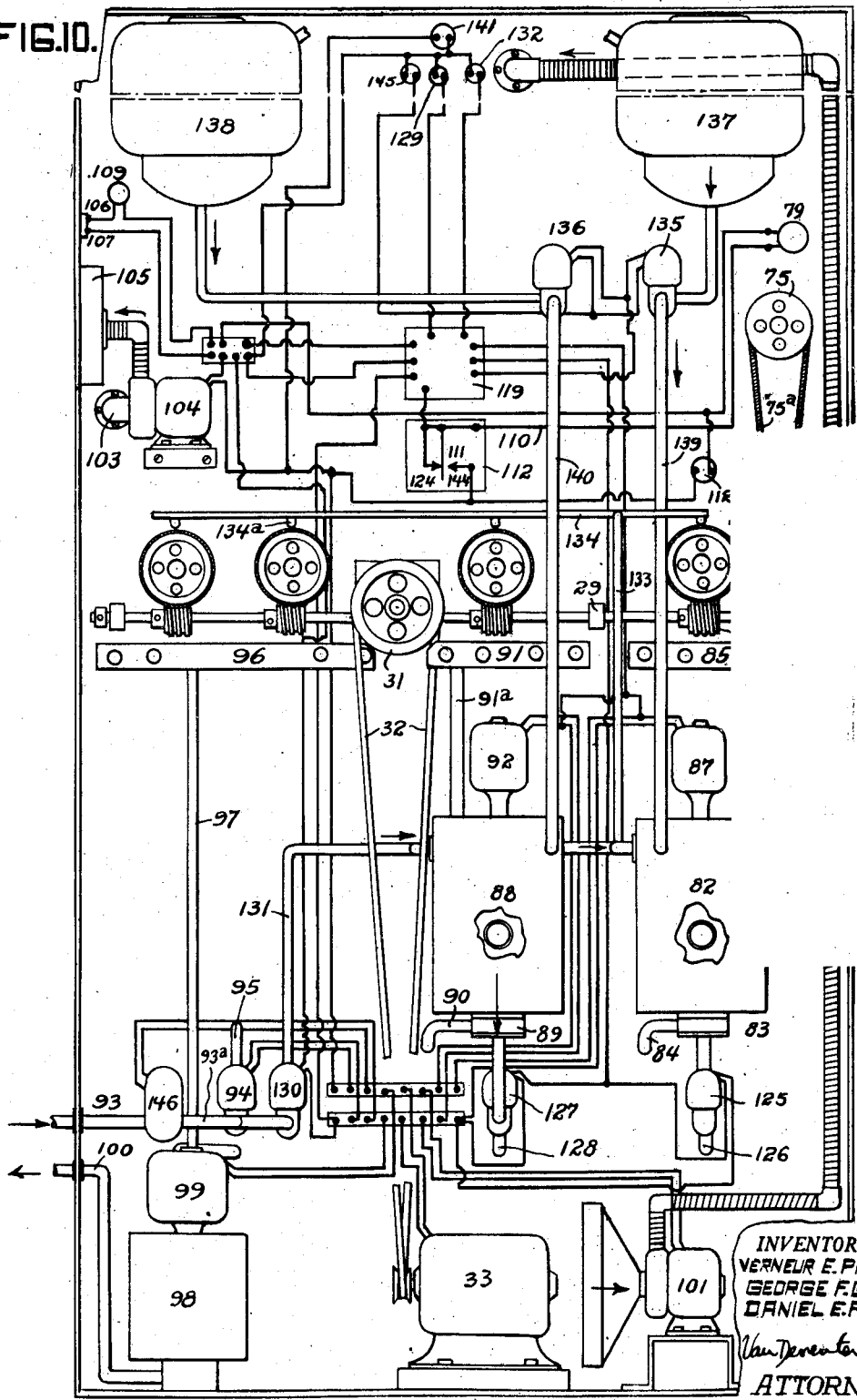

Oct. 7, 1947.  V. E. PRATT ET AL  2,428,681
APPARATUS FOR AUTOMATICALLY PROCESSING FILM
Filed Oct. 28, 1943  6 Sheets-Sheet 6
FIG.12.
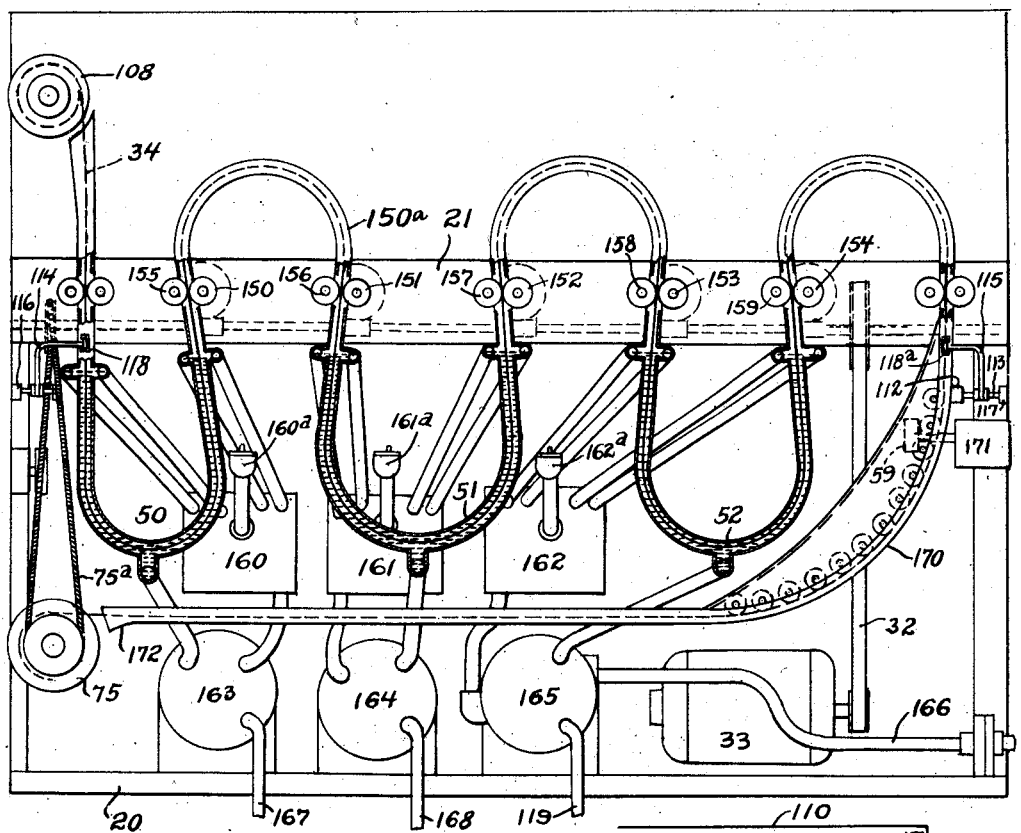
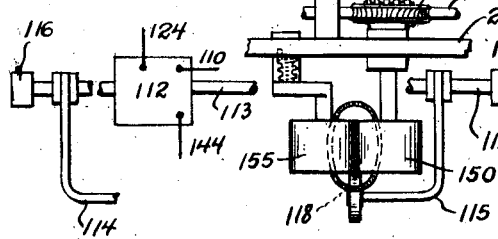
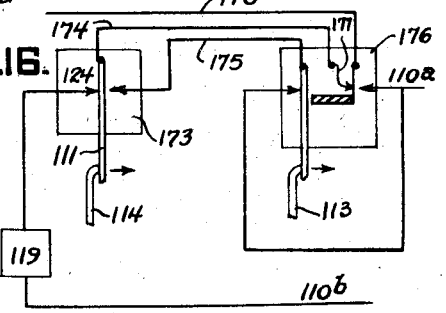
INVENTORS.
VERNEUR E. PRATT
GEORGE F. GRAY
DANIEL E. REED
BY
Van Deventer & Grier
ATTORNEYS.

Patented Oct. 7, 1947

2,428,681

UNITED STATES PATENT OFFICE 2,428,681

APPARATUS FOR AUTOMATICALLY PROCESSING FILM

Verneur E. Pratt, George F. Gray, and Daniel E. Reed, Norwalk, Conn.; said Gray and said Reed assignors to said Pratt Application October 28, 1943, Serial No. 507,938

17 Claims. (Cl. 95—94)

The present invention pertains to improvements in apparatus for automatically processing film. An object of the invention is to provide an improved apparatus for automatically processing sensitized photographic film.

Another object is to provide an improved device for automatically emptying used solutions from an apparatus of the character described, washing the apparatus and then refilling the apparatus with fresh solutions.

Another object is to provide an improved means for adjusting the film in an apparatus of the character described to compensate for the lengthening of the film which occurs when same is immersed in the solution.

Another object is to provide an improved device for automatically operating a continuous film processing apparatus by which proper and uniform results are produced without the exercise of special skill or the requirement of specially trained operators.

Further objects are to provide suitable apparatus to positively control, guide and feed the film strip during its passage through the apparatus, which is simple, compact, readily portable and easily operated without the use of a dark room.

Other objects and advantages of the invention will become evident in the course of the following description which discloses a preferred form of such apparatus.

In the accompanying drawings:

Figure 1 is a front elevation of a preferred form of the apparatus with door open to reveal the interior thereof.

Figure 2 is a transverse sectional view of the apparatus on the line 2—2, Figure 1.

Figure 3 is a sectional view on the line 3—3, Figure 2.

Figure 4 is an enlarged diagrammatic view of the roller feed mechanism, Figure 3.

Figure 5 is a diagrammatic view of the apparatus shown in Figure 1, illustrating the path of flow of liquids through the apparatus.

Figure 6 is a sectional view on the line 6—6, Figure 5.

Figure 7 is a view of the line 7—7, Figure 5.

Figure 8 is a view partly in section of the take-up adjustment mechanism shown in upper right hand corner of Figure 1.

Figure 9 is a diagrammatic view of part of the take-up mechanism shown in the upper right hand corner of Figure 1.

Figure 10 is a diagrammatic view of the apparatus shown in the preceding figures.

Figure 11 is a wiring diagram of the apparatus shown in Figure 8.

Figure 12 is a front elevation of an alternate form of the apparatus.

Figure 13 is a view partly in cross section of the film switch mechanism shown in Figure 12, and this may also be used in the apparatus shown in Figure 1.

Figure 14 is a diagrammatic view of the film adjusting mechanism shown in the preceding figures, in one position.

Figure 15 is a view similar to Figure 14 with the mechanism in another position.

Figure 16 is a diagram of an alternate circuit arrangement of the switch circuit shown in Figure 11.

Referring to Figure 1, the numeral 20 denotes a casing or cabinet having a door (not shown) which may be hinged or otherwise secured thereto in any suitable manner, in order to form, with the casing, a light tight box.

Film feeding mechanism

Secured in the casing in any suitable manner is a mounting plate 21 on which are assembled the guide and feed rollers as shown in Figures 1 to 4 inclusive. As each set of rollers is the same in construction and operation, only one set will be described in detail.

Referring more particularly to Figure 4, it will be seen that a feed roller is composed of a driving shaft 22 having a rigid supporting member 23 secured thereto, carrying an outer shell of resilient deformable material 24 of rubber or the like.

The driving shaft 22 is supported in the bearing 25 in plate 21 and the shaft on its rear end carries a worm wheel 26 adapted to be rotated by a worm 27 on worm shaft 28, said shaft being mounted in suitable bearing brackets 29 supported on plate 21. The shaft 28 extends along the rear of the three roller assemblies as shown in Figure 2, passing through a gear reduction box 30 supported on mounting plate 21; said gear reduction is provided with a driving pulley 31, which via the belt 32 or any other suitable means, is connected to the film driving motor 33 so that when the motor is in operation shaft 23 is revolved to turn all of the feed rollers in counter-clockwise direction at the same speed to move the film 34 engaged thereby lineally into the baths as hereinafter described.

Each of the feed rollers 24 is engaged by a pair of guide rollers 35, 36 having an outer surface of rubber or other resilient deformable material, the film 34 being interposed between guide and feed rollers as shown in the figures. The rollers 35, 36 are supported on shafts 37, 38 on which they are free to turn. These shafts are secured to the arms 39, 40 which are supported on the bearing brackets 41, 42 about which these arms are free to move. The outer ends of arms 39, 40 are forked as shown at 43 in Figure 3 to engage the adjusting members 44 movably secured in the arms by pins 45. These members are threaded to receive the lower threaded ends of bolts 46 having socket heads 47 and supported free to turn in the abutments 48. By applying a socket wrench to the sockets 47, and thereby revolving the bolts 46, the rollers, for example 35, may be moved away from or toward the roller 24 and the resilient surfaces of the rollers 24 and 35 deformed in a manner to be presently described for the purpose of compensating for the linear or longitudinal elongation of the film which occurs when the film is wetted.

Referring to Figure 1, a support 21a is secured to the casing 20 in any suitable manner, and, by clamping means as shown at 49, the ducts 50, 51, 52 are secured thereto in position so that their upper ends are positioned subjacent the feed and guide rollers as shown in Figures 1 to 4. Additional ducts 53, 54 may be secured to the plate 21 to enclose the loops 34a, 34b of the film 34 where same extends over the top of the rollers as shown.

Immediately above the last feed roller on the right, Figure 1, is mounted the dryer 55. This may consist of a short section of duct 55a surrounding the film 34 where it emerges from the last feed roller. The film then passes over a plurality of rollers 56 supported on a curved flexible metallic track member 57 suitably supported on 55 so that its left end is movable as later described, and forming an arcuate drying track for the film. This track is enclosed by a casing 58 forming a duct whereby air may be confined in contact with the film and circulated about the same to dry it as hereinafter described, this casing 58 having entrance and exit ducts 59, 60 for the air. Near the discharge end of the dryer and attached to the track member 57 thereof, as shown in detail in Figure 8, is a take-up mechanism and control switch. This may be mounted on the rear wall 29a of the cabinet and may include a bracket 61 supported on the shouldered bushings 62 which extend therethrough as shown. One of these bushings carries on its outer end the hand lever 63 free to move about the screw 64 securing same to the shaft 65 which extends through the upper bushing and through the rear wall of the cabinet.

The end 66 of lever 63 is slotted as shown at 67. A pin 68 passes through this slot and is secured in the arm 69 which has a slot 70 receiving pin 71 mounted on the bracket 61.

Secured to the arm 69 is a member 72 attached to the dryer track member 57 carrying rollers 56. The track extends downwardly as shown at 73 and carries at its lower extremity the grooved roller 74.

A take-up reel 75 driven in the usual manner by the belt 75a is mounted on the rear wall 29a. As shown in Figure 9 this wheel has a plurality of hooks 76 in its periphery adapted to grasp the usual holes in the leader strip or end of film 34. These pins can enter the V of pulley 73 as shown in dotted line, Figure 8.

The arrangement and construction of the take-up adjustment just described is such that by moving the lever 63 to the right, Figure 1, the film track and film is moved toward reel 75 so that hooks 76 therein can engage the film and wind it up on the reel, when, in the course of operation of the device, the leading end of the film emerges from the dryer adjacent the reel 75.

When the lever 63 is moved to the left, Figure 1, the film track, and consequently the film, is moved away from the take-up reel and consequently the leading end of the film will not be engaged thereby.

In order to prevent the operation of the apparatus when the take-up device is not in film-engaging position, the shaft 65 has a cam 77 secured thereto, which when the arm 63 is moved to the left, Figure 1, where the film will not be wound on reel 75, the plunger 78 of a switch 79 will be operated to open a circuit at the switch. This, as later described, prevents operation of the device except when the lever 63 is in film-engaging position.

A crank 80 and spring 81 connected as shown to shaft 65 and lever 63 make it possible in a well understood manner to move the lever over-center to either extreme position and have it remain in that position.

A feed roll 108 is rotatably supported on the rear wall 29a and carries a supply of film 34 which is fed through the apparatus as presently described.

Developing

Referring to the diagrams Figures 5 and 10, a receiving tank 82 for any suitable developer is provided having connected thereto a circulating pump 83 having a discharge pipe 84 connected to the bottom of the U-shaped duct 50. The developer is forced by the pump via pipe 84 through duct 50 to the manifolds 84a, 84b near the top of each leg thereof, said manifolds or enlarged portions being each connected via a pipe or pipes with a receiver 85, which via a pipe 86 returns the developer to the tank 82 after same has circulated through duct 50 in the direction of the arrows. A stirring motor 87 keeps the developer in the tank in constant agitation.

As a constant head of developer always exists in the duct 50, and as the film 34 passes therethrough at a constant speed, each portion of the film is subjected to the same time of development and this time can be regulated as desired by regulating the speed of the film drive at any point, for example, by regulating the speed of driving motor 33.

Hardening

If it is desired to subject the film after development to a hardening process, the receiving tank 88 for a suitable hardening solution is provided having connected thereto a suitable circulating pump 89 connected to the bottom of the U-shaped duct 51. The hardener is forced by the pump via pipe 90 through duct 51 to the manifolds 90a, 90b near the top of each leg thereof, said manifolds or enlarged portions being each connected via a pipe or pipes with a receiver 91 which via a pipe 91a returns the hardener to the tank 88. A stirring motor 92 keeps the hardener in the tank in constant agitation.

As a constant head of hardening solution exists in the duct 51, and as the film 34 passes therethrough at a constant speed, each portion of the film is subjected to the same time of hardening and this time can be regulated as desired by regulating the speed of the film.

Washing of film

A water supply pipe 93 is connected to an electric heater 146 of any suitable type and by pipe 93ª to an electrically controlled valve 94 having a discharge pipe 95 connected to the bottom of the U-shaped duct 51. Water passing the valve 94 flows via pipe 95 and through duct 51 to the manifolds 95ª, 95ᵇ near the top of each leg thereof, said manifolds or enlarged portions being each connected via a pipe or pipes with a receiver 96 which via a pipe 97 discharges the waste water to the sump tank 98. A temperature of from 75° to 85° F. is desirable for the water in duct 52 as it has been found that the water acts more efficiently at this temperature to cleanse the film from any developer, hardener or fixer used.

The sump tank may have a motor driven pump 99 adapted to discharge the contents thereof via the waste or drain pipe 100.

Drying of film

A suitable motor driven blower 101 discharges air via pipe 102 into the casing 58 of the dryer 55, Figure 1, at the point 59 shown in dotted lines. This air circulates about the film in the dryer and is withdrawn at the point 60 to which if desired the suction pipe 103 of a suitable motor driven air circulating device 104 may be connected to discharge the air through the outlet 105 in the casing 20. By this circulation of air within the dryer casing 58, the film 34 is effectively dried before it is wound on reel 75.

Film ducts and method of controlling position of film therein

The film ducts, particularly those designated by the numerals 50 to 52 inclusive, may be made of plastic material such as Lucite and preferably have the cross-section shown in Figure 7 so that only the edges 34ᶜ, 34ᵈ of the film are in contact with the inner walls of the ducts, particular care being taken that the image-receiving center portion of the film indicated at 34ᵉ be held out of contact with the ducts.

The speed at which the film passes through the ducts 50, 51, 52 is such that the loops 34ᶠ (and particularly this loop in duct 50) hang as free as possible within the U of the duct. However, as soon as the downwardly moving entering end of film 34 encounters the liquid in duct 50, the film starts to elongate. This rate of elongation may be $1/64$ inch to the lineal foot or more. As the feed rollers 24, 24ª, 24ᵇ, 24ᶜ are all moving at the same speed, the film, as it grows longer within duct 50 will buckle and tend to rub on the lower inner surface 50ª of the duct. It may also crumple at any point within the duct between the entrance and exit thereof.

To compensate for this "growing" of the film, or increase in length, by having the exit feed roller run faster than the entrance roller (which might be attempted as apparently obvious) not only necessitates a complete and independent set of feed and guide rollers and drives at the entrance and exit mouths of at least duct 50, but also introduces obvious mechanical complications of a serious nature both expensive and difficult to overcome, particularly in connection with adjustments while running.

By the following method, the "growing" of the film while in the liquid bath is easily compensated for and the film may be correctly positioned in the ducts while the apparatus is in operation.

Assuming that the guide rollers 35 and 36 are 1½ inches in diameter and that the feed roller is 2⅛ inches in diameter, and all the rollers are ¾ inch wide, the guide rollers 35 and 36 having outer resilient portions ⅜ inch thick and the roller 24 having an outer resilient portion or rim ⅛ inch thick, the resilient material being similar to an ordinary automobile tire casing and the rollers being arranged as shown in Figure 5.

Referring to Figure 14, it will be assumed that the tension on the rollers 35 and 36 is such that the film has elongated in developer duct 50 until the loop 34ᶠ of the film has moved out of its normal position between the inner walls 50ª, 50ᵇ of the duct and is rubbing upon the bottom wall 50ª. In other words, the film has "grown" while in the developer solution and it is desired to restore it to its normal position.

Referring now to Figure 15, the guide roller 36 is adjusted as previously described and is moved toward the roller 24, the center of 36 being moved through the angle A. This compresses the film 34 between rollers 24 and 36 because of the resiliency of these rollers which, instead of contacting the film across the very short space indicated at S, in Figure 14, now contact it over the space $S_1$, Figure 15, while the contact $S_2$ space, Figures 14 and 15, remains the same. The result is that the upwardly moving right hand leg of the film 34 is removed from the duct faster than the film in the left hand leg enters, so that the loop 34ᶠ thereof is moved upwards out of contact with the inside surface 50ª of the duct. When in contact with 50ª the length of the loop from the shaft of roller 24 is as shown at $L_1$ in Figure 14. When the loop is in the proper position midway in the duct as shown in Figure 15, then it is at the distance $L_2$, Figure 15.

It will be seen from the foregoing that by adjusting the guide rollers such as 35 and 36 in relation to the feed roller 24, while only a single feed roller is employed in connection with each one of the ducts, this feed roller is made to feed the film lineally downward at a different rate of speed from the upward feed of the film, or vice versa, and that by adjusting the rollers 35, 36, the loop 34ᶠ is maintained in the proper position between the walls 50ª, 50ᵇ of the duct 50. Of course, this method of adjustment can be applied to the rollers feeding ducts 51 and 52. It will be understood the Figures 14, 15 are diagrammatic in respect to the amount of "squeeze" between the rollers, and also in regard to the position assumed by the loops 34ᶠ and are merely illustrative of the peculiar result accomplished by "squeezing" the feed and drive rollers together as described.

It will also be understood that this method of obtaining what is in effect two speeds from the same drive pulley is not brought about at any time by slippage of the film at the feed roller. At all times the film is positively driven, the tension on the guide rollers being sufficient to insure this at all times, the difference in the rate of speed obtained by driving the film on opposite sides of the drive pulley being obtained entirely by the different amount of pressure or the "squeeze" of each feed roller against this pulley, which "squeeze" may be regulated while the apparatus is in motion.

Automatic operation of dumping, washing and filling solution tanks

The apparatus being arranged as shown in the diagram, Figure 10, and the various motors, switches, valves and controls being connected to the circuits as shown in Figure 11, the conductors 106, 107 are connected via the usual connecting cord and plug or in any other manner to a suitable power circuit such as 110 volts, 60 cycle, A. C.

The water supply pipe 93 is connected to a water supply and the waste or discharge pipe 100 to a place where the used water and solutions can be disposed of.

Developer supply tank 137 is filled with a suitable developer and hardener supply tank 138 with a suitable hardener.

The film to be processed is placed on the delivery reel 108.

The lever 63 is moved to the right, Figure 1, so that when the perforated leader strip of film 34 reaches the pulleys 56 and 74, it will be engaged by the hooks 76 and wound on reel 75. Moving this lever also closes switch 79. If the main switch 109 is closed, a circuit is completed via conductor 110 through the movable member 111 of a film switch generally denoted by the numerals 112. This switch which may be of any suitable construction is operated by a transverse shaft 113 which as shown in Figures 12 and 13, extends across the cabinet (this may be used with the apparatus Figure 1) and has at its ends the arms 114, 115. The rod can rotate axially in the bearings 116, 117 and the arms 114, 115 extend through apertures 118, 118$^a$ in the ducts 50 and 52 as shown, so that the film entering the ducts will engage the arms 114 and 115. When the trailing edge of the film 34 passes the arm 114, it is disengaged therefrom but at that time the film is still in the other ducts and when the trailing end leaves the last set of rollers on the plate 21, the arm 115 is disengaged. When there is no film in the ducts, switch 112 is in the position shown in Figure 11 and a circuit exists to the motor operated switch 119.

Switch 119 is of any suitable type (several of which are in common use) where it is desired to sequentially and cyclically make and break several circuits, and will not be described in detail. When its motor, or other electrically operated mechanism is energized, it operates a plurality of cams 120, 121, 122, 123 or other contact making and breaking devices in timed relation to successively open and close these contacts, and having completed these operations, the switch disconnects itself from the control circuit until another cycle is initiated by the operation of switch 112.

In Figure 11, a switch of this type is shown diagrammatically, and the motor 119$^m$ has a shaft 142 on which the cams 120 to 123, inclusive, are mounted; and this shaft also carries another cam 119$^c$ adapted to make electrical contact with the plunger 119$^p$ which is mechanically moved thereby so that after the cams 120 to 123, inclusive, have completed their cycle, the electrical contact between 119$^c$ and 119$^p$ is broken, thereby opening the circuit through the motor 119$^m$.

Now, if contact arm 111 in the switch 112 is moved to make contact at 144, a relay 119$^r$ is operated, the armature 119$^s$ of which moves the plunger 119$^p$, pushing it upward so that it again makes electrical and mechanical connection with the cam 119$^c$. But as the circuit through the cam and motor is broken at contact 124 in switch 112, the motor will not operate until contact 111 in switch 112 is moved to make contact at 124, thus energizing the motor 119$^m$.

It will be seen from the foregoing that switch 119 is a cyclic switch that will successively perform a series of operations, stopping itself by the operation of cam 119$^c$ until switch 112 is operated, as described. The parts 119$^c$, 119$^p$ and the relay 119$^r$ are merely shown as illustrative of one type of mechanism used in such switches and these parts and the circuits of switch 119 can be arranged in any suitable manner to function as described.

The first operation performed by switch 119 is to close a circuit via cam 120 thereof to dump valve 125 connected to the developer tank 82 which opens and discharges used developer via pipe 126 to the sump tank 98. A circuit is also closed through dump valve 127 connected to hardener tank 88, said valve discharging used hardener via pipe 128 to the sump tank 98. A circuit is also closed through the dump pilot light 129 which is illuminated during the operation of dumping the tanks 82 and 88. Cam 120 having completed its function, the circuits through valves 125 and 127 and pilot 129 are opened and the valves close and the pilot is extinguished. The timing of cam 120 is such that both tanks are drained before the valves 125, 127 are closed.

The second operation performed by switch 119 is that cam 121 now operates to open water valve 130 to admit water from the heater 146 from which it passes via pipe 93$^a$ to pipe 131 and thus to tanks 82 and 88. The washing pilot light 132 is illuminated while the water valve is open.

Pipe 131 connects to a pipe 133 which conducts water to a manifold 134 communicating with the outlet nozzles 134$^a$ or otherwise arranged to discharge water over the roller mechanism carried on plate 21 above the ducts to wash same.

Cam 121 having completed its function, the circuits through valve 130 and pilot 132 are opened, the valve closes and the pilot is extinguished. The timing of cam 121 is such that both tanks are filled before the valve 130 is closed.

The third operation performed by switch 119 is that cam 122 operates to repeat the dumping operation as described herein as the "first operation" of switch 119. Cam 122 dumps the wash water, with which tanks 82, 88 were filled, into the sump 98 as previously described.

The fourth operation performed by switch 119 is that cam 123 operates to open the fill valves 135, 136 connected respectively to the developer storage tank 137 and the hardener storage tank 138. While these valves are open, the liquids flow from the storage tanks 137, 138 to the tanks 82 and 88 via pipes 139, 140. During this filling operation, the filling pilot lamp 141 is illuminated.

The switch 119 is so timed that when tanks 82, 88 are filled with a sufficient amount of liquids, the switch completes its cycle of operations and the apparatus now stands ready to process the film.

It will be understood the cams 120 to 123, inclusive, or other instrumentalities used to make and break the circuits in switch 119 are all operated in timed relation, as by the common shaft 142.

*Automatic processing of film*

The leading end of film 34 on reel 108 is now pushed between rollers 35 and 24 which feed it into the open end 143 of duct 50. Here the edge of it engages the end of arm 114 of switch 112 which end extends into the duct 50 through the aperture 118 therein. This operates switch 112 and the movable contact 111 thereof is moved to make contact at 144. This completes the following circuits and causes the following operations to take place:

(a) The running pilot light 145 is illuminated.

(b) The electric heater 146 is energized to heat the water therein so it will be ready for use in the duct 52 and for washing the tanks and rollers.

(c) The water valve 94 is opened to admit water via pipe 95 to duct 52 through which the water circulates, leaving same via manifolds 95ª, 95ᵇ, receiver 96, pipe 97 to sump 98.

(d) The sump pump 99 is energized to pump any liquids in the sump out through waste pipe 100. The pumps 83 and 89 are also energized.

(e) The film driving motor 33 is energized which via belt 32 and pulley 31 rotates shaft 28 and the drive rollers 24, 24ª, 24ᵇ, 24ᶜ driven thereby to move the film through the apparatus. Shaft 28 also via belt 75ª operates take-up reel 75 in the usual manner.

(f) Blower motors 101 and 104 are energized to circulate air through the dryer.

(g) The stirrer motors 87, 92 are energized and operate to keep the fluids in tanks 82 and 88 thoroughly agitated.

The operations (a) to (g), inclusive, just referred to begin simultaneously upon the closing of contacts 111 and 144 of switch 112. After passing the switch arm 114 of switch 112 on the left side of the apparatus, the film 34 continues downward in duct 50, passes up the right leg of same, is placed between rollers 24 and 36, passes through duct 53 and down between rollers 24ª and 35ª below the right end of this duct. While in duct 50, the film is subject to the action of the developer therein.

After passing rollers 24ª, 35ª the film enters the left leg of duct 51 at 147, passes through duct 51 where it is subjected to the hardening solution therein and emerges therefrom, passing between rollers 24ª and 36ª, passes through duct 54, between rollers 35ᵇ and 24ᵇ, and enters the left hand leg of duct 52 at 148. In duct 52 the film is washed and emerges at the upper right leg thereof, passes between rollers 24ᶜ and 36ᵇ and passes upwardly into the dryer, as shown in Figure 5. The film passes upwardly through the dryer and is dried therein.

When the leader end of the film reaches the take-up reel 75 it is engaged and wound thereon as previously described and the process of developing, hardening, washing, drying and winding continues until the terminal end of the film is reached.

When the terminal end of the film runs downwardly past the arm 114 of switch 112, while the arm is released because the film no longer supports it, the switch 112 is not operated, as the arm 115 connected to shaft 113 which controls the switch is still supported by the film at a point near the right end 149 of duct 52 and it is not until the arm 115 is released by the film, that switch 112 operates to open its contacts 111, 144. At this time the film has been removed from ducts 50, 51, 52 and only a short piece remains in the dryer, this short piece is practically all wound up by the time the apparatus stops.

When arm 115 is released and contacts 111, 144 break, all the apparatus shown to the right of the dotted line X, Figure 11, and which has been operating as described in the foregoing paragraphs (a) to (g) hereof, is disconnected from the circuit and ceases to operate to automatically process film.

Switch 112 closes contacts 111 and 124 and the apparatus now proceeds to the "automatic operation of dumping, washing, and filling solution tanks" as previously described. However, if the lever 63 has been moved so that switch 79 is in open circuit position, or if the main switch 109 is moved to open circuit position, the apparatus will not go through the dumping, washing and filling operations until both said switches are closed.

If desired an auxiliary switch 112ª may be connected across the contacts 111, 144 of switch 112 so as to operate the apparatus to the right of X, Figure 11, even if there is no film in the device.

Figure 12 shows an alternate form of apparatus having certain features such as the control switch 112 which can be used with the preferred form of apparatus previously described.

This alternate form of apparatus is of somewhat simplified construction and is not as fully automatic as the preferred form.

In Figure 12 the numerals 150ª denote a single continuous duct having openings therein for the driving rollers 150 to 154, inclusive, which may be driven same as the drive rollers in the apparatus, Figure 1.

The rollers 155 to 159, inclusive, may be adjustable as described in connection with rollers 35, Figure 1.

Developer tank 160, hardener tank 161 and water circulating tank 162 are filled by hand through filler spouts 160ª, 161ª, 162ª and the developer and hardener and water circulate in the U-legs and duct 150 as previously described, while the pumps 163—164—165 connected thereto are in operation, these pumps and the film drive motor 33 being on a common circuit controlled by contacts 111 and 124 of switch 112. A water supply pipe 166 is suitably connected to the water system.

The drain pipes 167, 168, 169 may be provided with manual valves, or with electrically operated valves as described in connection with the preceding figures.

In this type of apparatus the dryer 170 is located as shown below the film feeding mechanism and is supplied with air via a blower 171. The dryer has a duct 172 extending to a point adjacent the take-up reel 75.

Obviously, details of construction separately shown in either embodiment of the invention, Figures 1 or 12, can be used in both.

Also, many modifications can be made without departing from the teachings of this disclosure. For example, two switches like switch 112 can be used instead of a single switch operated by the shaft 113 and arms 114, 115. Such an arrangement is shown in Figure 16, where switch 173 replaces switch 112 in the diagram, Figure 11. This is operated by arm 114 as previously described. This is connected by conductors 174, 175 with switch 176 operated by arm 113. The conductor 110 connects to switch 176 as does conductor 110ª.

Switch 173 operates same as switch 112 previously described, when switch 176 is in the position shown, the film not having progressed to switch 176. When switch 176 is operated by arm 113, then the end of the film has released arm 114 in switch 173 and contacts 111, 124 therein close, but 111 is open at contact 177 so motor switch 119 is not energized until arm 113 in switch 176 is released by the film and the circuit 110, 177, 174, 111, 124, 119, 110ᵇ completed. The joint operation of these switches accomplishes the same result as the operation of switch 112 previously described, but the use of two switches eliminates the transverse shaft 113.

Obviously, the operation of switch 119 can be varied within wide limits without changing its function. For example, referring to its "first operation" as herein described, instead of separate dump valves 125 and 127 a single electrically operated valve having two passage ways therein for the developer and hardener can be used. Such valves are well known. This is equally true of the fill valves 135, 136.

Driving motor 33, blower motors 101 and 104 can be combined in a single motor driving respectively the pump 99, the film moving mechanism shown as driven by motor 33 and blowers 101 and 104. Such modifications are apparent to one skilled in the art and do not depart from the automatic cyclic operation and control method herein described.

What is claimed is:

1. In film processing apparatus, a support, a plurality of U-shaped ducts disposed in spaced relation on said support in a common plane with open ends or legs of said ducts vertical, roller means adjacent to each of said open ends for feeding a film through all said ducts, in the form of a series of loops engaged only by said roller means, and a separate motor-driven circulating pump for each of said ducts, each pump having its outlet port connected to the bottom of its duct to deliver fluid thereto and having its inlet port connected to each of the legs of its duct at points below the open ends thereof for removing said fluid therefrom.

2. In film processing apparatus, a support, a plurality of U-shaped ducts carried on said support in spaced relation and lying in a common plane with open-ended legs thereof extending upwardly, a series of arcuate film guides carried on said support and positioned thereon above adjacent ends of said U-shaped ducts, roller means adjacent to the open ends of each of said ducts for moving said film through said ducts and said guides in a series of depending and inverted loops, said depending loops being within said ducts and said inverted loops being within said guides, and separate liquid circulating means for each of said ducts connected to operate simultaneously to circulate the several processing liquids, employed in the processing of said film, through said ducts.

3. In film processing apparatus, a U-shaped duct carried on a support and having open-ended legs extending upwardly, roller means adjacent to the open end of one of said legs for delivering film thereto, roller means adjacent to the open end of the other leg for removing film therefrom, a fluid outlet port formed in each of said legs below the open ends thereof and adapted to determine the liquid level in said ducts, a fluid inlet port formed at the bottom of the U, and fluid circulating means having its outlet port connected to deliver a stream of fluid to said duct via said inlet port, whereby part of said stream passes up one of said legs to its outlet port and the remainder of said stream passes up the other leg to its outlet port, said fluid circulating means having an inlet port connected to remove said fluid from said duct via said outlet ports.

4. In film processing apparatus, a support, a series of upright U-shaped open-ended ducts spaced apart from each other and having their legs equidistant from and secured to said support, a series of inverted tubular open-ended guide ducts carried on said support above and spanning adjacent legs of said first ducts, the open ends of said inverted ducts being spaced apart from the open ends of said upright ducts, and a series of sets of cooperative driven and free film feed rollers tending under the urge of spring means to contact each other and disposed in the spaces between said open ends for engaging and directing film through all said ducts in a series of inverted and depending loops.

5. In film processing apparatus, an upright open-ended U-shaped duct having an inlet leg and an exit leg, a set of cooperating rollers having deformable engaging surfaces adapted to engage film along a line above and in substantially vertical alignment with the open end of said inlet leg for delivering film thereto, a second set of cooperating rollers having deformable engaging surfaces adapted to engage said film along a line above and in substantially vertical alignment with the open end of said exit leg for removing film therefrom, means to drive said rollers, and adjustable means connected to one roller in each set for moving it relative to its cooperating roller, whereby said rollers may be adjusted to deliver film to said inlet leg and to remove film from said exit leg at substantially the same rate, the film within said duct remaining in the form of a depending loop.

6. In film processing apparatus, a switch controlled by the film, a second switch controlled by said first switch and having circuit controlling mechanism therein, a U-shaped duct through which said film is passed in the form of a free loop, said duct having inlet and outlet ports, liquid circulating means including a pump having its outlet connected to the inlet on said duct and having its inlet connected to the outlet of said duct, said circulating means being electrically controlled by said mechanism, a second duct having inlet and outlet ports, a second liquid circulating means including a second pump having its inlet and outlet connected respectively to the outlet and inlet of said second duct, said film also passing through said second duct in the form of a free loop, said second circulating means also being electrically controlled by said mechanism, a motor controlled by said mechanism, and means driven by said motor for moving said film through said ducts in the form of free loops as aforesaid.

7. In film processing apparatus, a duct, and mechanism for moving film to be processed therethrough, said duct having an aperture formed in the wall thereof, a switch biased toward a closed position and including a movable member extending through said aperture and into the path of said film, said movable member being adapted, when engaged by film, to hold said switch open, a second switch connected to and controlled by said first switch and adapted to operate cyclicly, said second switch being connected to and adapted to energize the following circuits in the order named: a first circuit connected to a prime mover driving liquid circulating means in fluid connection with said duct; and a second circuit connected to an electric motor driving said mechanism for moving said film through said duct.

8. In apparatus of the class described, a support, a duct carried on said support, roller means for delivering film into one end of said duct at a predetermined rate, other roller means for removing film from the other end of said duct at substantially the same rate, a switch having an actuating arm extending into the duct via an opening therein and adapted to be engaged by film, said switch having circuit controlling mechanism therein for cyclicly controlling a plurality of circuits, one of said circuits including an electric water heater, a second of said circuits being adapted to supply energy for means for circulating heated water through said duct, a third of said circuits including a motor adapted to drive said roller means, said circuits being energized cyclicly in the order named.

9. In film processing apparatus, a support, a plurality of ducts disposed on said support in a common plane, the entrance end of one duct being adjacent to the exit end of the preceding duct, other ducts between adjacent ends of said first ducts and in open communication therewith, cooperating roller means adjacent to the entrance and exit openings of each of said first ducts and adapted to deliver film to and remove film from said ducts at substantially the same rate, a film switch having an arm engaged by said film, said film switch being adapted to remain open as long as said arm is engaged by said film and adapted to close when said arm is disengaged from said film, a motor for driving said roller means, an electrical circuit connected to a source of current and to said motor, a control switch in said circuit, means between said film switch and said control switch for controlling the operations of the latter, electrically operated means for supplying water to said roller means to wash the same, said last means also being connected to said control switch, whereby when the latter is in one position energy is supplied to said motor and when in another position energy is supplied to said electrically operated means, so that said roller means may be washed only when the same is at rest.

10. In film procesing apparatus wherein electrically operated instrumentalities for effecting the operations of dumping the contents of solution tanks therein, washing said tanks by admitting water thereto, dumping the water, and supplying the tanks with fresh solutions, are automatically energized under control of switching means including circuits connected to said instrumentalities and to a source of current, a second switch adapted to set said switching means into operation, and including a movable member in the path of and engaged by film moving through said apparatus, said last switch being held open when and as long as said movable member is engaged by said film, and said switch being biased to close and initiate said dumping operations when said movable member is disengaged from said film.

11. In apparatus of the class described, a vertical support, a plurality of upright open-ended U-shaped ducts carried on said support and having their axes parallel to and equidistant from said support, a plurality of inverted open-ended U-shaped ducts spanning adjacent ends of said first ducts and having their ends spaced apart from the ends of said first ducts, means including cooperative driven and free rollers urged toward each other and adapted to engage film along lines above and adjacent to the open ends of said first ducts for advancing said film through all said ducts in a series of depending and inverted loops, individual fluid circulating means for and in communication with each of said first ducts, an electrical circuit, motor means connected to said circuit for operating said circulating means, a motor connected to said circuit for operating said first means, and switching means in said circuit for controlling said motor and said motor means.

12. In film processing apparatus, a tank and a duct, an electrical circuit, a switch in said circuit and means to operate the same cyclicly, control means for said switch including an arm projecting into said duct and adapted to be engaged by film being processed, said arm when disengaged from said film being adapted to energize said circuit, said switch having a first circuit controlling element connected in a circuit with electrical means for operating a dump valve communicating with said tank, and with electrical means for operating a second dump valve, a second tank and duct, said second dump valve being connected to said last tank, a second circuit controlling element in said switch connected in a circuit with electrical means for operating a wash water valve adapted to supply water to said tanks, a third circuit controlling element in said switch adapted to close the circuit connected to said first controlling element for operating said dump valves a second time during the cycle, and a fourth circuit controlling element in said switch connected in a circuit with electrical means for operating fill valves adapted to fill said tanks after the second operation of said dump valves as aforesaid.

13. In film processing apparatus, a tank and a duct, an electrical circuit, a film switch in said circuit and including a movable arm extending into said duct for engagement with the film to be processed, said switch being adapted to be closed when film is disengaged from said movable arm, a second switch connected to be controlled by said first switch and adapted to operate cyclicly, said second switch having a first circuit controlling element connected in a circuit with electrical means for operating a dump valve connected to said tank, and with a second electrical means for operating a second dump valve, a second tank and duct, said second dump valve being connected to said second tank, a second circuit controlling element in said second switch connected in a circuit with electrical controls for a wash water valve adapted to flush said tanks, a third circuit controlling element in said second switch adapted to complete the circuit connected to said first circuit controlling element to initiate a second dumping operation during the cycle, and a fourth circuit controlling element in said second switch included in a circuit with electrical means for operating fill valves adapted to fill said tanks after said second dumping operation.

14. In a device of the character described, an open-ended duct adapted to receive film in the form of a loop, a first switch including an actuating member extending into said duct and adapted to be engaged by film being processed, a second switch connected to and controlled by said first switch and having circuit controlling mechanism therein, means for circulating liquid in fluid connection with said duct, said means being connected to an electrical circuit controlled by said mechanism, a second open-ended duct adapted to receive said film also in the form of a loop, means for circulating liquid in fluid connection with said second duct, said last means being also connected in a second electrical circuit controlled by said mechanism, a third duct adapted to receive said film, means included in a third electrical circuit and controlled by said mechanism for circulating liquid in fluid connection with said third duct, a motor also connected in a circuit controlled by said mechanism, and roller means arranged in sets adjacent the open ends of said ducts and driven by said motor for moving said film through said ducts in a series of loops as aforesaid.

15. In film processing apparatus, a storage tank, a receiving tank with an electrically controlled valve therebetween to permit liquid to flow from said first tank to said second tank, a support, a film duct carried on said support and connected to said receiving tank, motor operated circulating means between said receiving tank and said duct for circulating liquid therein, a second duct carried on said support, said ducts lying on a common plane, means for circulating water through said last duct, roller means for delivering film into one end of said first duct, roller means for removing film from the other end of said first duct and for delivering the same to the adjacent end of said second duct, and roller means for removing film from the other end of said second duct, an electric motor for driving said roller means, whereby said film is moved through said ducts in a series of loops, and switching means including at least one movable arm extending into said first duct in the path of the film, said switching means being connected to a source of current and including electrical circuits connected to said valve, to the motor driving said circulating means, and to the motor driving said roller means, said switching means being adapted to operate sequentially to energize said circuits in the order named.

16. In apparatus for processing film, a tank, a substantially vertical U-shaped duct, roller means for delivering film into one end of said duct, other roller means for removing film from the other end of said duct, whereby said film is moved therethrough in the form of a loop, an inlet port formed at the bottom of said duct, exit ports formed in the legs of said duct above and spaced apart from said inlet port, motor means for driving said roller means, a motor driven pump for delivering liquid to said inlet port from said tank at a predetermined rate and for delivering liquid from said outlet ports to said tank at the same rate, thereby circulating said liquid through said duct and said tank, electrically controlled means for draining and washing said tank, other electrically controlled means for filling said tank with liquid, and switching means including circuits connected to all said last means for supplying energy thereto sequentially, said switching means including actuating means extending into said duct and adapted to hold said switching means open only while said actuating means is engaged by film moving through said duct to be processed.

17. In film processing apparatus having a pair of tanks for containing solutions, electrically controlled fill and dump valves connected to said tanks, a support, a series of vertical U-shaped film processing ducts disposed in a common plane on said support and connected to said tanks, a film washing duct also U-shaped and disposed on said support in said plane, an electrically controlled valve for admitting water to said last mentioned duct, other electrically controlled valves for admitting wash water to said tanks, a film switch including actuating means extending into at least the first duct in said series and adapted to be held open only while said actuating means is engaged by film passing therethrough, a control switch controlled by said film switch and connected to a source of current and having a first circuit connected to the electrical controls of said dump valves, a second circuit including the electrical control of said valve for admitting water to said tanks, a third circuit for supplying energy the second time to the electrical means for controlling said dump valves, and a fourth circuit connected to the electrical controls for opening said fill valves to supply fresh solutions to said tanks, said control switch being adapted to close said circuits in the order named.

VERNEUR E. PRATT.
GEORGE F. GRAY.
DANIEL E. REED.

REFERENCES CITED

The following references are of record in the file of this patent:

UNITED STATES PATENTS

| Number | Name | Date |
|---|---|---|
| 2,263,380 | Coleman | Nov. 18, 1941 |
| 1,570,809 | Wescott | Jan. 26, 1926 |
| 1,460,206 | Masland, 2d. | June 26, 1923 |
| 2,158,817 | Dotezel, Jr. | May 16, 1939 |
| 2,223,767 | Lloyd | Dec. 3, 1940 |
| 2,186,927 | Hughey | Jan. 9, 1940 |
| 1,758,326 | Langsner | May 13, 1930 |
| 1,854,335 | Jerzykowski | Apr. 19, 1932 |
| 2,191,850 | Debrie | Feb. 27, 1940 |
| 1,900,825 | Liberman | Mar. 7, 1933 |
| 1,974,353 | Zollinger | Sept. 18, 1934 |
| 1,656,522 | Josepho | Jan. 17, 1928 |
| 1,912,427 | Bodan et al. | June 6, 1933 |
| 2,036,442 | Tanatar | Apr. 7, 1936 |
| 1,987,387 | Conklin | Jan. 8, 1935 |
| 1,991,249 | Ingman et al. | Feb. 12, 1935 |
| 1,679,096 | Pourfillet | July 31, 1928 |
| 1,956,072 | Duvall | Apr. 24, 1934 |
| 1,809,830 | Cobb | June 6, 1931 |
| 2,096,232 | Ensign | Oct. 19, 1937 |
| 2,376,207 | Tetzlaff | May 15, 1945 |
| 2,207,127 | Tondreau | May 28, 1940 |

FOREIGN PATENTS

| Number | Country | Date |
|---|---|---|
| 642,376 | Germany | Sept. 18, 1934 |
| 37,706 | France | Oct. 21, 1930 |
| 23,508 | France | July 5, 1921 |
| 834,867 | France | Sept. 5, 1938 |
| 844,158 | France | Apr. 11, 1939 |